United States Patent [19]

Prior

[11] Patent Number: 4,515,243

[45] Date of Patent: May 7, 1985

[54] SAWHORSE BRACKET

[76] Inventor: Herbert E. Prior, 17045 Arnold Dr., Sonoma, Calif. 95465

[21] Appl. No.: 530,516

[22] Filed: Sep. 9, 1983

[51] Int. Cl.[3] ........................ B27B 21/00; F16M 11/00

[52] U.S. Cl. .................................... 182/155; 182/181; 182/225

[58] Field of Search ................ 182/155, 153, 181–186, 182/225, 226

[56] References Cited

U.S. PATENT DOCUMENTS

| | | | |
|---|---|---|---|
| 292,352 | 1/1884 | Phillips | 182/155 |
| 843,118 | 2/1907 | Struble | 182/155 |
| 1,711,328 | 4/1929 | Russell | 182/155 |
| 1,842,012 | 1/1932 | Cline | 182/155 |
| 2,594,464 | 4/1952 | Loucks | 182/155 |
| 3,282,379 | 11/1966 | Jones | 182/155 |
| 3,637,045 | 1/1972 | Poffenbaugh | 182/155 |
| 3,738,451 | 6/1973 | Kirkpatrick | 182/155 |

*Primary Examiner*—Reinaldo P. Machado
*Attorney, Agent, or Firm*—Melvin R. Stidham

[57] ABSTRACT

A leg assembly for a trestle comprising a channel of an internal width to receive a lumber beam, which is hinged to a plate bent at an obtuse angle to form a depending panel shaped as a trapezoid. Means are provided to secure lumber legs to and along the edges of the depending panel to form A-frames which diverge with respect to each other because the steel panels to which they are attached are disposed at obtuse angles to the beam.

7 Claims, 2 Drawing Figures

SAWHORSE BRACKET

BACKGROUND OF THE INVENTION

There are available metal brackets to which lengths of standard lumber, such as 2×4's, may be secured to form a conventional sawhorse or trestle. However, a sawhorse, once assembled with such brackets, is not collapsible and not easily transported from place to place. Moreover, such brackets are generally formed so that the two pairs of legs are disposed parallel to a vertical plane, and do not diverge with respect to each other, as is desirable for greater stability.

OBJECTS OF THE INVENTION

It is an object of this invention to provide brackets for a trestle, which enable the trestle to be collapsed to facilitate storage and transporting thereof.

It is a further object of this invention to provide leg brackets for a trestle that enable the use of lumber of various thicknesses to enable the user to select the relative overall strength and weight of the trestle.

It is a further object of this invention to provide leg brackets for a sawhorse wherein the pairs of legs, as well as the legs of each pair, diverge from top to bottom for maximum stability.

Other objects and advantages of this invention will become apparent from the description to follow, particularly when read in conjunction with the accompanying drawing.

SUMMARY OF THE INVENTION

In carrying out this invention, I provide leg brackets that include a beam supporting channel which is hinged to a leg supporting plate. The leg supporting plate is bent at an obtuse angle to form a depending portion having the outline of a trapezoid with two pairs of equal angles, so that lengths of lumber secured to and along their edges would naturally be disposed in "A" configuration, with the "A" being at an obtuse angle with respect to the horizontal beam.

DESCRIPTION OF A PREFERRED EMBODIMENT

Figure 1:
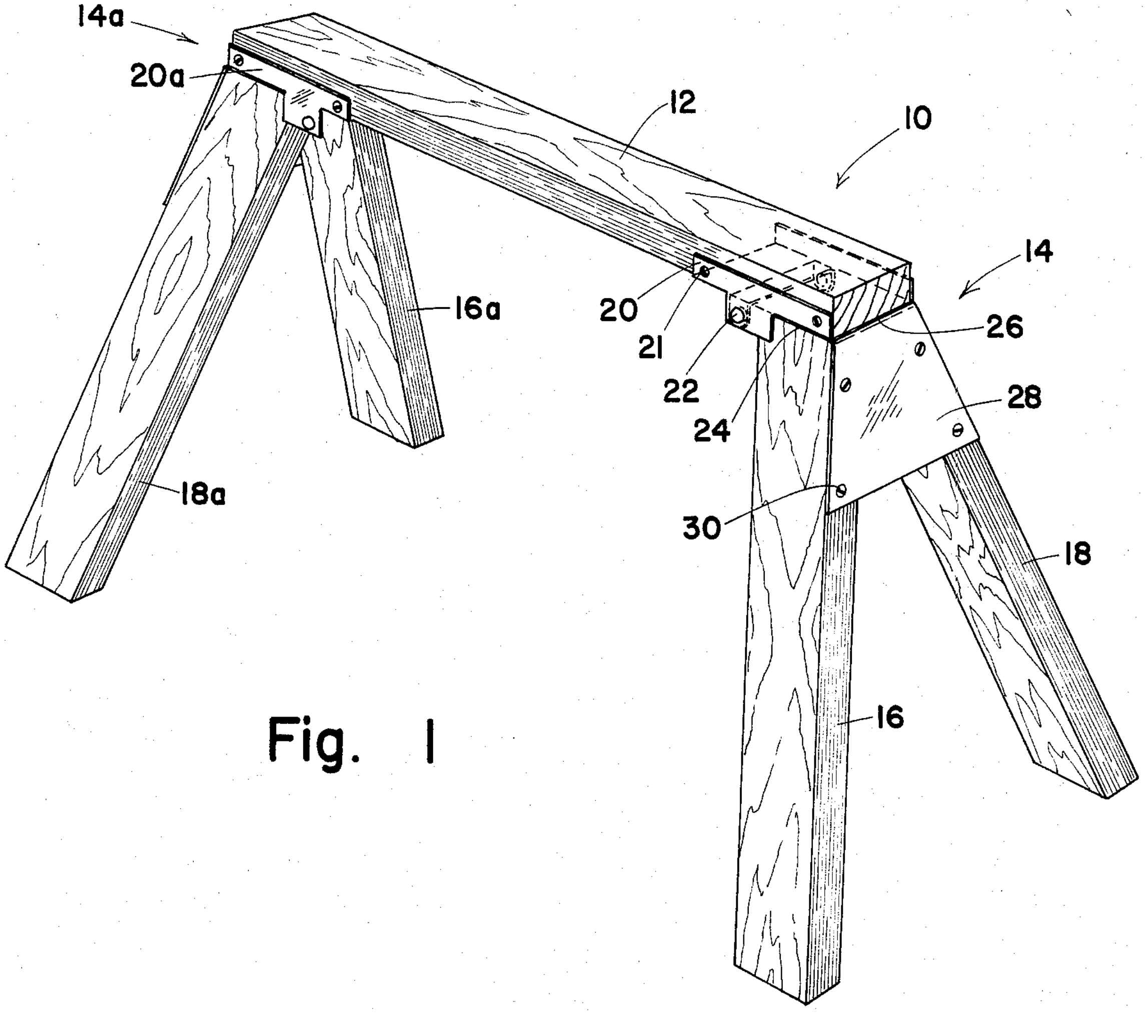
FIG. 1 is a view in perspective of a trestle incorporating the brackets of this invention.

Referring now to the drawing with greater particularlity, a sawhorse or trestle 10 includes at each end of a horizontal beam 12 of standard lumber, the metal brackets 14 and 14*a* of this invention, each for support of a pair of legs 16, 18 and 16*a*, 18*a*.

Each bracket 14 and 14*a* includes a horizontal channel 20 of an inside width to receive rather snugly the width of a standard finished lumber. For example, in a preferred form the inside width of the channel 20 may be 3½ inches to accommodate a standard 4" width board, such as a 2×4 or 1×4, disposed on its side. Hence, if the work load to which the trestle 10 is to be subjected can be handled by a 1×4 beam, the user can effect a saving in weight by using 1×4's to facilitate transporting. The beam 12 is secured to the channels 20 and 20*a*, as by means of screws 21.

Hinged at 22 to the beam supporting channel is the leg bracket plate 24 which is bent at an obtuse angle at 26 to form a depending panel 28. The depending panel 28 is formed as a trapezoid with two pairs of equal angles so that when the legs, 16 and 18 are secured thereto along the edges, as by means of screws 30, they will naturally be disposed in an "A" configuration. Further, because the depending panel 28 is disposed at an obtuse angle with respect to the upper part of the plate 24 the pairs of legs 16, 18 and 16*a*, 18*a* will also diverge with respect to each other, for greater stability. Further, because the depending panel is formed as a rigid plate, with the legs 16 and 18 secured along their edges, the fabricator has a choice of lumber sizes, depending upon the strength and lightness desired. Also, in forming the legs, the edges of the bent leg support plate 24, 28 may be used as a template or guide to scribe the lumber to be used as the legs 16 and 18 for the proper angle cut.

Figure 2:
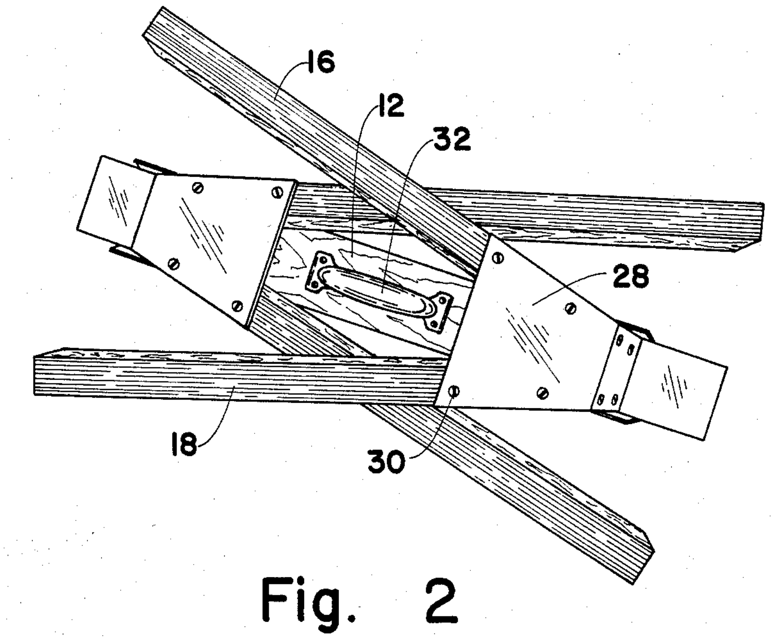
FIG. 2 is a view in perspective of the trestle collapsed for transporting to or from a job site.

Finally, a suitable handle 32 (FIG. 2) may be secured to the underside of the beam 12 so that, when the legs are collapsed to the positions shown in FIG. 2, the trestle is easily carried from place to place as required.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A trestle comprising:
a beam of lumber;
a leg assembly secured near each end of said beam;
each said leg assembly comprising:
first and second rigid plates;
said second plate being bent to form a depending portion at the outboard end thereof;
a hinge connecting the inboard end of said second plate to said first plate;
means securing said first plate to the underside of said lumber beam;
said depending portion being shaped as a trapezoid; and
a pair of lumber legs secured to and along the edges of said depending portion to depend therefrom.

2. The trestle defined by claim 1 wherein:
said second plate is bent at an obtuse angle so that said depending portion and said legs slope outward from top to bottom.

3. The trestle defined by claim 1 including:
a carrying handle secured to the underside of said lumber beam intermediate the ends thereof.

4. The trestle defined by claim 1 wherein:
said first plate is the web portion of a channel of an inside width to accommodate a standard dimension of finished lumber.

5. A leg assembly for a trestle comprising:
first and second rigid plates;
said second plate being bent to form a depending portion at the outboard end thereof;
a hinge connecting the inboard end of said second plate to said first plate;
means for securing said first plate to the underside of a lumber beam;
said depending portion being shaped as an equilateral trapezoid; and means for securing a pair of lumber legs to and along the edges of said depending portion to depend therefrom.

6. The leg assembly defined by claim 5 wherein: said second plate is bent at an obtuse angle so that said depending portion slopes outward from top to bottom.

7. The leg assembly defined by claim 5 wherein: said first plate is the web portion of a channel of an inside width to accommodate a standard dimension of finished lumber.

* * * * *